(12) United States Patent
Maruo et al.

(10) Patent No.: US 9,819,035 B2
(45) Date of Patent: Nov. 14, 2017

(54) FUEL CELL SYSTEM

(71) Applicant: TOYOTA JIDOSHA KABUSHIKI KAISHA, Toyota-shi, Aichi-ken (JP)

(72) Inventors: Tsuyoshi Maruo, Toyohashi (JP); Yoshiaki Naganuma, Toyota (JP); Tomohiro Ogawa, Miyoshi (JP); Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/933,570

(22) Filed: Nov. 5, 2015

(65) Prior Publication Data
US 2016/0141686 A1 May 19, 2016

(30) Foreign Application Priority Data

Nov. 14, 2014 (JP) .................................. 2014-231850

(51) Int. Cl.
*H01M 8/04* (2016.01)
*H01M 8/04746* (2016.01)
(Continued)

(52) U.S. Cl.
CPC ... *H01M 8/04761* (2013.01); *H01M 8/04231* (2013.01); *H01M 8/04253* (2013.01);
(Continued)

(58) Field of Classification Search
CPC ......... H01M 8/04761; H01M 8/04253; H01M 8/04388; H01M 8/04686; H01M 8/04231;
(Continued)

(56) References Cited

U.S. PATENT DOCUMENTS

2006/0134478 A1* 6/2006 Fuse ................. H01M 8/04097
429/415
2008/0014472 A1 1/2008 Logan
(Continued)

FOREIGN PATENT DOCUMENTS

CN         1860634 A      11/2006
JP       H02-250268 A     10/1990
(Continued)

*Primary Examiner* — Muhammad Siddiquee
(74) *Attorney, Agent, or Firm* — Finnegan, Henderson, Farabow, Garrett & Dunner, LLP

(57) ABSTRACT

The present invention provides a fuel cell system capable of suppressing the accumulation of impurities in a hydrogen system even when a hydrogen pump stops. A fuel cell system 100 includes a hydrogen pump 4, which is provided in a hydrogen gas circulation flow path 3 and which circulates a hydrogen off-gas discharged from the outlet side of a hydrogen electrode 1a of a fuel cell 1 to the inlet side of the hydrogen electrode 1a, a discharge valve 61, through which the hydrogen off-gas flowing in the hydrogen gas circulation flow path 3 is discharged out of the hydrogen gas circulation flow path 3, a determination section 81, which determines whether the hydrogen pump 4 is stopped, and a control unit 80, which controls the opening/closing of the discharge valve 61. If the determination section 81 determines that the hydrogen pump 4 has been stopped, then the control unit 80 controls the opening/closing of the discharge valve 61 to increase the discharge amount of the hydrogen off-gas discharged through the discharge valve 61 so as to be greater than the discharge amount of the hydrogen off-gas discharged on the assumption that the hydrogen pump 4 is in operation.

3 Claims, 2 Drawing Sheets

(51) Int. Cl.
  *H01M 8/04223* (2016.01)
  *H01M 8/0438* (2016.01)
  *H01M 8/04664* (2016.01)
  *H01M 8/04119* (2016.01)

(52) U.S. Cl.
  CPC ... *H01M 8/04388* (2013.01); *H01M 8/04686* (2013.01); *H01M 8/04179* (2013.01); *H01M 2250/20* (2013.01); *Y02T 90/32* (2013.01)

(58) Field of Classification Search
  CPC .......... H01M 2250/20; H01M 8/04179; Y02T 90/32
  See application file for complete search history.

(56) References Cited

U.S. PATENT DOCUMENTS

| | | |
|---|---|---|
| 2008/0220303 A1 | 9/2008 | Yoshida |
| 2009/0029200 A1 | 1/2009 | Izutani et al. |
| 2011/0212371 A1 | 9/2011 | Itoga |
| 2013/0196240 A1 | 8/2013 | Furusawa et al. |

FOREIGN PATENT DOCUMENTS

| | | |
|---|---|---|
| JP | 2004-349068 A | 12/2004 |
| JP | 2005-032502 A | 2/2005 |
| JP | 2005-032652 A | 2/2005 |
| JP | 2008-047518 A | 2/2008 |
| JP | 2005-327597 A | 2/2011 |
| JP | 2012-059614 A | 3/2012 |
| KR | 10-2005-0075383 A | 7/2005 |
| WO | WO 2004-105165 A2 | 12/2004 |
| WO | WO 2005-112159 A1 | 11/2005 |

\* cited by examiner

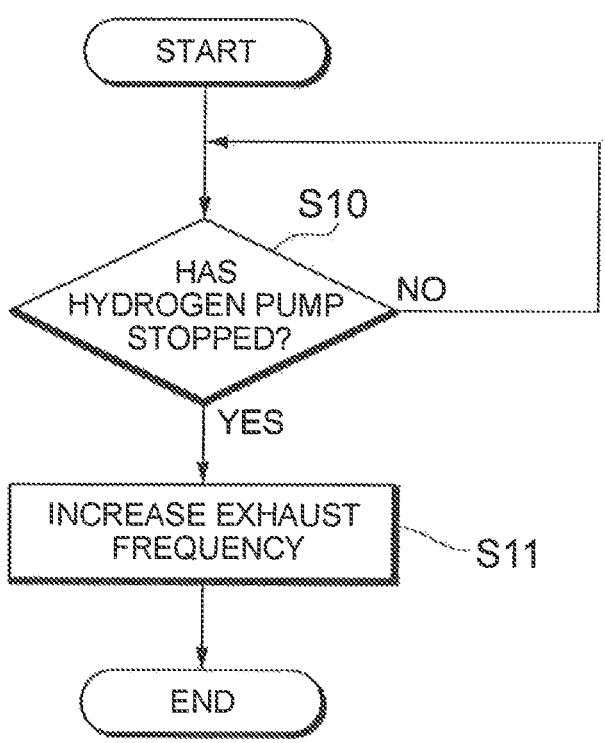

FUEL CELL SYSTEM

BACKGROUND OF THE INVENTION

Field of the Invention

The present invention relates to a fuel cell system.

Background Art

There has been known a fuel cell system applied to a fuel cell automobile or the like. The fuel cell system is a system that mainly includes a fuel cell stack, as its main unit, provided with an anode electrode to which hydrogen is supplied as a fuel gas and a cathode electrode to which air is supplied, a tank storing a fuel gas, such as hydrogen, to be supplied to the anode electrode, and a hydrogen circulation mechanism (hydrogen pump) for returning an exhaust gas which contains an unused fuel gas back to the anode. In the fuel cell stack, hydrogen and the oxygen contained in air react to generate power.

It is known that, as the reaction proceeds in the fuel cell, the nitrogen in a cathode gas (air) or the water generated by the reaction oozes out from the cathode electrode to the anode electrode through an electrolyte membrane. This increases the partial pressure of nitrogen and the like (hereinafter collectively referred to as "impurities") at the anode electrode, and the concentration of the fuel gas (hydrogen) decreases, undesirably deteriorating the power generation performance of the fuel cell.

Generally, therefore, in a fuel cell system provided with the foregoing hydrogen circulation mechanism or the like, a discharge valve provided in a discharge flow path on the anode electrode side (hereinafter referred to also as "the hydrogen system") is opened to discharge unused hydrogen or a gas containing impurities. For example, Patent Document 1 describes a system in which the concentration of the impurities in the hydrogen system is estimated on the basis of the pressure of the hydrogen system of the fuel cell and the hydrogen partial pressure in the hydrogen system, and a discharge valve is opened according to the estimated concentration of the impurities, thereby discharging a hydrogen off-gas (unused hydrogen or a gas containing impurities discharged from the anode electrode).

CITATION LIST

Patent Document(s)

[Patent Document 1] JP2005-327597A

The impurities normally allowed in the hydrogen system are determined on the assumption that the foregoing hydrogen circulation mechanism is in operation. There has been a danger that if the hydrogen circulation mechanism stops due to, for example, freezing, then impurities accumulate in the discharge flow path of the hydrogen system. This has been posing a problem in that the accumulation of the impurities blocks the flow of the gas to be discharged from the fuel cell, leading to uneven power generation in the cell surfaces of the fuel cell.

SUMMARY OF THE INVENTION

The present invention has been made in view of the problem described above, and an object of the invention is to provide a fuel cell system capable of suppressing the accumulation of an impurity in a hydrogen system even when a hydrogen pump stops.

To this end, a fuel cell system in accordance with the present invention is a fuel cell system provided with a fuel cell which receives the supply of a fuel gas and an oxidizing gas to an anode electrode and a cathode electrode, respectively, to generate power, including: a hydrogen pump provided in a hydrogen gas circulation flow path to circulate a hydrogen off-gas discharged from an outlet side of the anode electrode to an inlet side of the anode electrode; a discharge valve through which the hydrogen off-gas flowing in the hydrogen gas circulation flow path is discharged out of the hydrogen gas circulation flow path; a determination section which determines whether the hydrogen pump is stopped; and a control unit which controls the opening/closing of the discharge valve, wherein, in the case where the determination section determines that the hydrogen pump has stopped, the control unit controls the opening/closing of the discharge valve to increase the amount of discharge of the hydrogen off-gas through the discharge valve so as to be greater than the discharge amount of the hydrogen off-gas discharged on the assumption that the hydrogen pump is in operation.

According to the fuel cell system in accordance with the present invention, if the determination section determines that the hydrogen pump has stopped, then the control unit controls the opening/closing of the discharge valve to increase the amount of discharge of the hydrogen off-gas through the discharge valve so as to be greater than the discharge amount of the hydrogen off-gas discharged on the assumption that the hydrogen pump is in operation. If the hydrogen pump stops, impurities tend to accumulate in a discharge flow path (e.g. the piping on the downstream side of a fuel cell) of a hydrogen system. Hence, in such a situation, the discharge amount of the hydrogen off-gas can be increased to be greater than the discharge amount of the hydrogen off-gas discharged on the assumption that the hydrogen pump is in operation. As a result, the accumulation of the impurities in, for example, the piping on the downstream side of the fuel cell can be suppressed, thus making it possible to suppress the deterioration of the fuel cell.

Further, in the fuel cell system in accordance with the present invention, the control unit preferably controls the opening/closing of the discharge valve to increase the amount of discharge of the hydrogen off-gas through the discharge valve according to an output value of the fuel cell or a required value supplied to the fuel cell.

In this preferred mode, the discharge amount of the hydrogen off-gas is increased according to an output value of the fuel cell or a required value supplied to the fuel cell. As the output value of the fuel cell or the required value supplied to the fuel cell increases, the impurities increase. Therefore, the accumulation of the impurities in the piping on the downstream side of the fuel cell can be suppressed by increasing the discharge amount of the hydrogen off-gas as described above.

The present invention makes it possible to provide a fuel cell system capable of suppressing the accumulation of impurities in a hydrogen system even when a hydrogen pump stops.

BRIEF DESCRIPTION OF THE DRAWINGS

FIG. 2 is a flowchart illustrating the control of the fuel cell system illustrated in FIG. 1.

DESCRIPTION OF THE PREFERRED EMBODIMENTS

Figure 1:
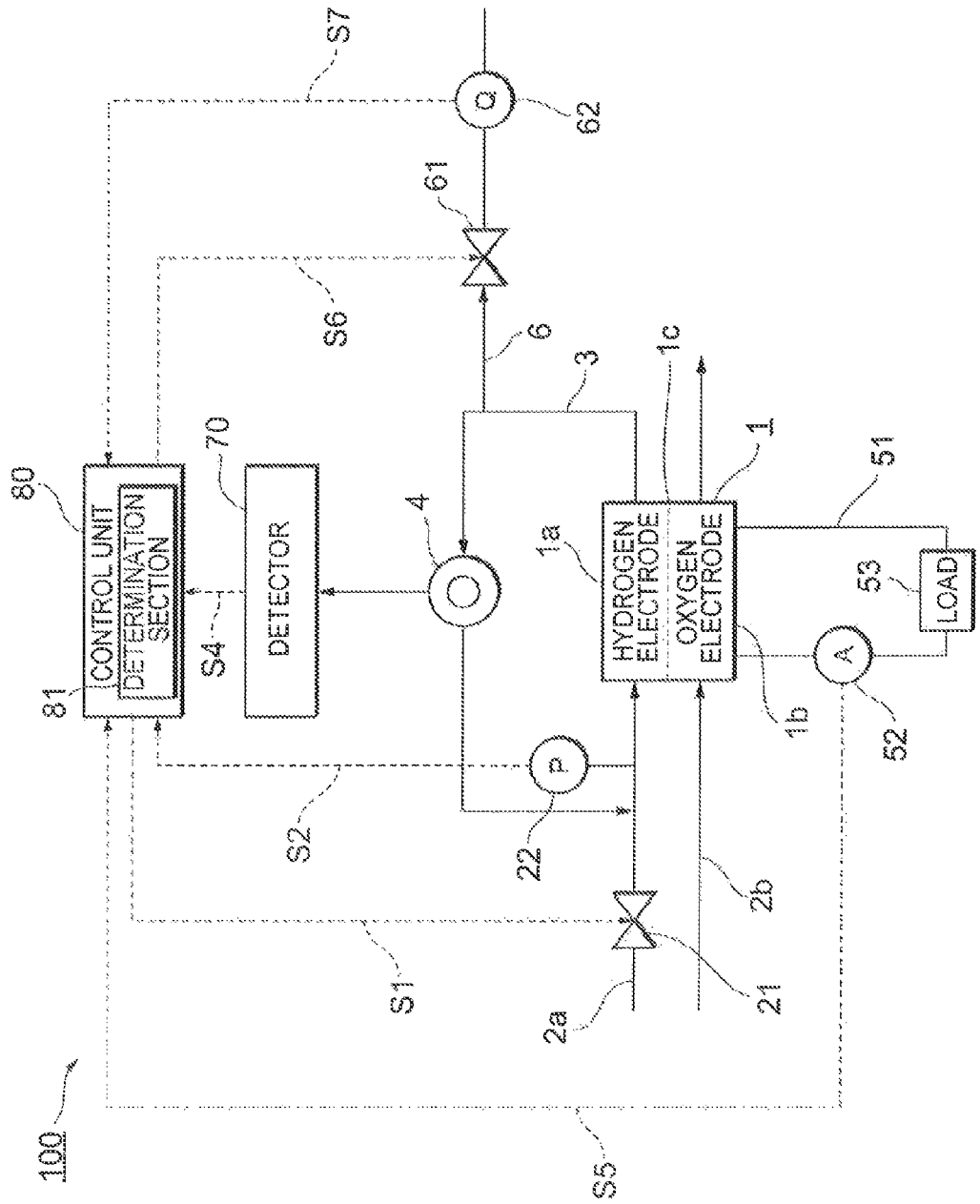
FIG. 1 is a system block diagram illustrating the configuration of a fuel cell system according to an embodiment of the present invention.

The following will describe an embodiment of the present invention with reference to the accompanying drawings.

Although the present invention will be described in connection with the following preferred embodiment, the present invention can be modified using a number of techniques without departing from the scope of the present invention, and can be implemented in other embodiments other than the present embodiment. Therefore, all modifications within the scope of the present invention will be covered by the appended claims.

(Fuel Cell System)

First, the configuration of a fuel cell system according to the embodiment of the present invention will be described. FIG. 1 is a system block diagram illustrating the configuration of the fuel cell system.

A fuel cell system 100 is a system which is mounted on a fuel cell automobile (hereinafter also referred to simply as "the vehicle"), and carries out various types of control on a fuel cell (fuel cell stack) 1. As illustrated in FIG. 1, the fuel cell system 100 has the fuel cell 1, a hydrogen gas supply flow path 2a, a supply valve 21, a pressure gauge 22, an oxidizing gas supply flow path 2b, a hydrogen gas circulation flow path 3, a hydrogen pump 4, a discharge flow path 6, a discharge valve 61, a flowmeter 62, a detector 70, a control unit 80, a determination section 81, a current cable 51, and a current sensor 52.

The fuel cell 1 is constituted of a stack of unit cells. Each of the unit cells is composed of electrodes, which are made of porous membranes or the like permitting the diffusion of gases and which are formed on both surfaces of an electrolyte membrane 1c, conductive separators being held among layers. An output voltage based on the number of the stacked layers can be taken out. For the sake of explanatory convenience, the drawing illustrates only the configuration of the unit cell having an anode electrode (hydrogen electrode) 1a and a cathode electrode (oxygen electrode) 1b formed on the electrolyte membrane 1c surface. As illustrated, hydrogen (a fuel gas) is supplied from the hydrogen gas supply flow path 2a to the hydrogen electrode 1a, while air (an oxidizing gas) is supplied from the oxidizing gas supply flow path 2b to the oxygen electrode 1b. Thus, the fuel cell 1 receives the supply of the fuel gas and the oxidizing gas and generates power. The voltage of the power generated by the fuel cell 1 is output through the current cable 51 to, for example, an inverter which supplies a current based on a command torque or the like to motors for driving a vehicle, various types of auxiliary machines mounted on the vehicle, or batteries, which are secondary batteries for feeding power to the auxiliary machines (all these being collectively indicated by "a load 53").

The hydrogen gas supply flow path 2a is the flow path for supplying hydrogen to the inlet side of the hydrogen electrode 1a of the fuel cell 1 described above. The oxidizing gas supply flow path 2b is the flow path for supplying air to the inlet side of the oxygen electrode 1b.

The hydrogen gas circulation flow path 3 is the flow path for circulating the hydrogen gas from the outlet side of the hydrogen electrode 1a to the inlet side thereof. The hydrogen gas circulation flow path 3 is provided with a hydrogen pump 4. Further, the discharge flow path 6 is connected to the hydrogen gas circulation flow path 3 to make it possible to discharge the gas, which flows in the hydrogen gas circulation flow path 3 and which contains impurities or the like, out of the hydrogen gas circulation flow path 3.

The hydrogen pump 4 is a device that pressure-feeds the gas containing the impurities or the like, which is discharged from the outlet side of the hydrogen electrode 1a and passed through the hydrogen gas circulation flow path 3, to the inlet side of the hydrogen electrode 1a. In other words, the hydrogen pump 4 is a device that circulates the gas containing the impurities or the like, which flows in the hydrogen gas circulation flow path 3, from the outlet side of the hydrogen electrode 1a to the inlet side thereof. The hydrogen pump 4 may be any device insofar as the device has the function for circulating a gas in the hydrogen gas circulation flow path 3, and may be selected among various types of pumps.

The discharge flow path 6 is a flow path in communication with the hydrogen gas circulation flow path 3 to discharge the gas containing impurities or the like flowing in the hydrogen gas circulation flow path 3 to the outside of the hydrogen gas circulation flow path 3. The discharge flow path 6 is provided with the discharge valve 61 and the flowmeter 62. The discharge valve 61 and the flowmeter 62 will be discussed in more detail later. However, the flowmeter 62 may be omitted.

The various types of sensors and the valves, which constitute the fuel cell system 100, will now be described. As illustrated in FIG. 1, the hydrogen gas supply flow path 2a is provided with the supply valve 21 and the pressure gauge 22.

The supply valve 21 is a valve for regulating the flow rate of hydrogen (the amount of hydrogen) to be supplied to the hydrogen electrode 1a. The supply valve 21 is controlled by a control signal S1 from the control unit 80 so as to regulate the amount of opening thereof.

The pressure gauge 22 is a device which detects the pressure inside the hydrogen gas supply flow path 2a, that is, the pressure at the anode electrode 1a of the fuel cell 1. In other words, the pressure gauge 22 has a function for acquiring the pressure at the anode electrode side (the hydrogen system) of the fuel cell. A signal S2 corresponding to a pressure detected by the pressure gauge 22 is output to the control unit 80.

The current cable 51 is connected to the fuel cell 1. The current cable 51 is provided with the current sensor 52. The current sensor 52 is a sensor for detecting the current value of the power generated by the fuel cell 1. A signal S5 corresponding to the current value detected by the current sensor 52 is output to the control unit 80. The output signal S5 of the current sensor 52 corresponds to the amount of the power generated by the fuel cell 1. In the present embodiment, the control unit 80, which will be discussed later, controls the opening/closing of the discharge valve 61 to increase the discharge amount (exhaust frequency) of the hydrogen off-gas discharged through the discharge valve 61 according to the current value of the fuel cell 1.

Alternatively, the output value of the fuel cell 1 may be calculated by the control unit 80 on the basis of the current value detected by the current sensor 52, and the control unit 80 may control the opening/closing of the discharge valve 61 to increase the discharge amount (exhaust frequency) of the hydrogen off-gas discharged through the discharge valve 61 according to an output value of the fuel cell 1. Further alternatively, the control unit 80 may control the opening/closing of the discharge valve 61 to increase the discharge amount (exhaust frequency) of the hydrogen off-gas discharged through the discharge valve 61 according to a required value supplied to the fuel cell 1. Further alternatively, the control unit 80 may control the opening/closing of the discharge valve 61 to increase the discharge amount (exhaust frequency) of the hydrogen off-gas discharged through the discharge valve 61 according to the load 53 connected through the fuel cell 1 and the current cable 51.

The discharge flow path 6 connected to the hydrogen gas circulation flow path 3 is provided with the discharge valve 61 and the flowmeter 62. The discharge valve 61 is a valve capable of regulating the opening amount or the opening time of the discharge flow path 6. By controlling the opening amount of the discharge valve 61 the unused hydrogen or a gas containing impurities (nitrogen, water and the like) can be discharged from the hydrogen electrode 1a to the outside. The discharge valve 61 is controlled according to a control signal S6 from the control unit 80. The discharge valve 61 may use any type of valve insofar as the valve is capable of regulating the opening amount or the opening time of the discharge flow path 6.

The flowmeter 62 is a device which detects the flow rate of a fluid discharged through the discharge flow path 6. More specifically, the flow rate detected by the flowmeter 62 corresponds to the discharge amount of the gas (the hydrogen off-gas) which contains the unused hydrogen or impurities (nitrogen, water and the like) discharged from the hydrogen electrode 1a. A signal S7 corresponding to the flow rate detected by the flowmeter 62 is output to the control unit 80. The flowmeter 62 in the present embodiment detects the flow rate (the discharge amount) of the hydrogen off-gas discharged through the discharge valve 61 when the hydrogen pump 4 is in operation, and outputs the signal S7 corresponding to the detected flow rate to the control unit 80.

The flowmeter 62 may be omitted. For example, if the discharge valve 61 permits accurate adjustment of the opening amount, then the discharge amount of the hydrogen off-gas can be regulated on the basis of the opening amount, the opening time or the number of openings or closings of the discharge valve 61 without using the flowmeter 62 for detecting the flow rate in the discharge flow path 6. Further alternatively, the pressure in the hydrogen gas circulation flow path 3 can be calculated by the control unit 80 on the basis of the operation state of the fuel cell 1. Then, based on the calculated pressure, the discharge amount can be regulated according to the amount of discharge observed when the discharge valve 61 is opened for a predetermined time.

The detector 70 detects, for example, the rpm, the power consumption or the current consumption of the hydrogen pump 4, and outputs a signal S4 corresponding to the detected information to the control unit 80. When the signal S4 corresponding to the information detected by the detector 70 is output to the control unit 80, the determination section 81 determines the operation state of the hydrogen pump 4 (e.g. whether the hydrogen pump 4 is at a halt) corresponding to the signal S4.

The control unit 80 includes a CPU, a ROM, a RAM, an A-D converter, an input/output interface and the like, which are not illustrated. As described above, the control unit 80 controls the supply valve 21 or the discharge valve 61 according to the detection signals S2, S5 and S7 received from the pressure gauge 22, the current sensor 52, and the flowmeter 62, respectively. More specifically, the control signals S1 is sent to the supply valve 21 or the control signal S6 is sent to the discharge valve 61. According to the present embodiment, the control unit 80 estimates the current hydrogen partial pressure in the hydrogen electrode 1a on the basis of the signal S2 corresponding to the pressure detected by the pressure gauge 22, and estimates the concentration of the impurities (or the amount of the impurities) in the hydrogen electrode 1a on the basis of the estimated hydrogen partial pressure. Further, the control unit 80 controls the discharge valve 61 according to the estimated concentration of the impurities. In other words, the control unit 80 controls the discharge valve 61 according to the estimated concentration of the impurities so as to increase the discharge amount of the hydrogen off-gas discharged from the hydrogen electrode 1a.

Further, the control unit 80 includes the determination section 81. According to the detection signal S4 from the detector 70, the determination section 81 determines whether the hydrogen pump 4 has stopped. If the determination section 81 determines that the hydrogen pump 4 has stopped, then the control unit 80 sends the control signal S6 to the discharge valve 61 so as to control the opening/closing of the discharge valve 61, thereby increasing the discharge amount of the hydrogen off-gas to be greater than that of the hydrogen off-gas discharged on the assumption that the hydrogen pump 4 is in operation. When the determination section 81 determines that the hydrogen pump 4 has stopped, the discharge amount, which is increased to be greater than that of the hydrogen off-gas discharged on the assumption that the hydrogen pump 4 is in operation, is calculated on the basis of the operation state under the same condition except for the on/off of the hydrogen pump 4. The phrase "the operation state under the same condition except for the on/off of the hydrogen pump 4" includes a state in which the operation of a device (e.g. the fuel cell 1) other than the hydrogen pump 4 when the hydrogen pump 4 is in operation and the operation of a device (e.g. the fuel cell 1) other than the hydrogen pump 4 when the hydrogen pump 4 is stopped are being performed under the same condition. Thus, according to the present embodiment, the discharge amount of the hydrogen off-gas to be increased when the hydrogen pump 4 is stopped is adjusted on the assumption that the device other than the hydrogen pump 4 is operating under the same condition. The control of the opening/closing of the discharge valve 61 may be, for example, the control for increasing the opening amount of the discharge valve 61, the control for extending the opening time, or the control for increasing the numbers of openings/closings (shortening a purge cycle). According to the present embodiment, if, for example, a hydrogen pump rpm deviation, which will be discussed later, is a specified value or more when a cell voltage decreases, then the control unit 80 carries out control to shorten the purge cycle.

(Processing Flow of the Fuel Cell System)

The following will describe the method for controlling the discharge valve 61 by the control unit 80 of the fuel cell system 100. FIG. 2 is a flowchart illustrating an example of the processing carried out by the control unit 80. The processing is repeatedly carried out at a predetermined cycle while the fuel cell 1 is in operation.

First, in step S10, based on the detection signal S4 from the detector 70, the determination section 81 determines whether the hydrogen pump 4 is brought to a halt due to, for example, freezing. If the determination section 81 gives a determination result indicating that the hydrogen pump 4 is in operation (NO in step S10), then the processing in step S10 is continued. If the determination section 81 determines that the hydrogen pump 4 is at a halt (YES in step S10), then the procedure proceeds to step S11. The determination condition in step S10 may be, for example, whether the pump rpm deviation is equivalent to or more than a specified value, or more specifically, whether the measurement value (actual measurement value) of the pump rpm is lower than a pump rpm command value.

Subsequently, in step S11, the control unit 30 carries out control to increase the exhaust frequency of the hydrogen off-gas. To be specific, according to the detection signal S4 output from the detector 70, the control unit 80 controls the opening/closing of the discharge valve 61 so as to increase the discharge amount of the hydrogen off-gas to be greater than that of the hydrogen off-gas discharged on the assumption that the hydrogen pump 4 is in operation. In other words, the control unit 80 controls the opening/closing of the discharge valve 61 such that the discharge amount of the hydrogen off-gas when the hydrogen pump 4 is stopped is greater than that of the hydrogen off-gas discharged when the hydrogen pump 4 is in operation on the assumption that a device other than the hydrogen pump 4 operates under the same condition. As described above, the control of the opening/closing of the discharge valve 61 may be, for example, the control for increasing the opening amount of the discharge valve 61, the control for extending the opening time, or the control for increasing the number of the openings/closings (shortening the purge cycle). Thus, controlling the opening/closing of the discharge valve 61 makes it possible to increase the discharge amount (the exhaust amount) of the hydrogen off-gas to be greater than the discharge amount under the same condition as that when the hydrogen pump 4 is in operation.

As described above, the present embodiment has the determination section 81, which determines whether the hydrogen pump 4 has stopped, and the control unit 80, which controls the opening/closing of the discharge valve 61, and if the determination section 81 determines that the hydrogen pump 4 has stopped, then the opening/closing of the discharge valve 61 is controlled to increase the discharge amount of the hydrogen off-gas discharged through the discharge valve 61 to be greater than the discharge amount of the hydrogen off-gas discharged on the assumption that the hydrogen pump 4 is in operation. When the hydrogen pump 4 is stopped, impurities tend to accumulate in the piping (the hydrogen gas circulation flow path 3 in the present embodiment) on the downstream side of the fuel cell 1. In such a case, the frequency of exhaust (the amount of discharge) of the hydrogen off-gas through the discharge valve 61 is increased to be higher than the exhaust frequency (the discharge amount) of the hydrogen off-gas on the assumption that the hydrogen pump 4 is in operation. This makes it possible to suppress the accumulation of the impurities in the piping on the downstream side of the fuel cell, leading to suppressed deterioration of the fuel cell 1.

Further, according to the present embodiment, the opening/closing of the discharge valve 61 is controlled to increase the discharge amount of the hydrogen off-gas discharged through the discharge valve 61 according to an output value of the fuel cell 1 or a required value supplied to the fuel cell 1. If the output value of the fuel cell 1 or the required value of the fuel cell 1 increases, then the amount of the impurities generated increases. Hence, in the case where the amount of the impurities generated increases, the discharge amount of the hydrogen off-gas is increased accordingly. As a result, even if the amount of the impurities generated increases, the accumulation of the impurities in the piping on the downstream side of the fuel cell 1 can be suppressed.

The above has described the embodiments of the present invention with reference to the specific examples. However, the present invention is not limited to these specific examples. More specifically, modifications obtained by persons skilled in the art by adding design changes as appropriate to the specific examples are to be embraced in the scope of the present invention insofar as such modifications include the features of the present invention. The elements provided in the foregoing specific examples, and the placement, the conditions, and the like of the elements can be modified as appropriate rather than being limited to those illustrated.

DESCRIPTION OF REFERENCE NUMERALS

1: Fuel cell
1a: Hydrogen electrode (Anode electrode)
1b: Oxygen electrode (Cathode electrode)
1c: Electrolyte membrane
2a: Hydrogen gas supply flow path
2b: Oxidizing gas supply flow path
3: Hydrogen gas circulation flow path
4: Hydrogen pump
6: Discharge flow path
21: Supply valve
22: Pressure gauge
51: Current cable
52: Current sensor
53: Load
61: Discharge valve
62: Flowmeter
70: Detector
80: Control unit
81: Determination section
100: Fuel cell system

What is claimed is:

1. A fuel cell system having a fuel cell that receives the supply of a fuel gas and an oxidizing gas to an anode electrode and a cathode electrode, respectively, to generate power, comprising:
   a hydrogen pump provided in a hydrogen gas circulation flow path to circulate a hydrogen off-gas discharged from an outlet side of the anode electrode to an inlet side of the anode electrode;
   a discharge valve through which the hydrogen off-gas flowing in the hydrogen gas circulation flow path is discharged out of the hydrogen gas circulation flow path;
   a detector that detects a parameter associated with the hydrogen pump; and
   a control unit which controls the opening/closing of the discharge valve, the control unit being programmed to:
      determine whether the hydrogen pump is stopped based on the parameter associated with the hydrogen pump, via a determination section; and
      control the opening/closing of the discharge valve to increase the amount of discharge of the hydrogen off-gas through the discharge valve, when the determination section determines that the hydrogen, pump has stopped, so as to be greater than the discharge amount of the hydrogen off-gas discharged when the hydrogen pump is in operation.

2. The fuel cell system according to claim 1, wherein the control unit is programmed to control the opening/closing of the discharge valve to increase the amount of discharge of the hydrogen off-gas through the discharge valve according to an output value of the fuel cell or a required value supplied to the fuel cell.

3. The fuel cell system according to claim 2, wherein the control unit is programmed to control the opening/closing of the discharge valve to increase the amount of discharge of the hydrogen off-gas through the discharge valve when the output value of the fuel cell increases or the required value supplied to the fuel cell increases.

* * * * *